March 23, 1954  J. WEBB ET AL  2,672,956
HYDRAULICALLY-OPERATED FRICTION BRAKE
Filed Feb. 5, 1952  3 Sheets-Sheet 1

Inventors
John Webb &
Daniel Webb

March 23, 1954     J. WEBB ET AL     2,672,956
HYDRAULICALLY-OPERATED FRICTION BRAKE
Filed Feb. 5, 1952     3 Sheets-Sheet 3

Inventors
John Webb &
Daniel Webb

Patented Mar. 23, 1954

2,672,956

UNITED STATES PATENT OFFICE 2,672,956

HYDRAULICALLY-OPERATED FRICTION BRAKE

John Webb and Daniel Webb, London, England, assignors to The India-Rubber, Gutta Percha & Telegraph Works Company Limited, London, England, a British company Application February 5, 1952, Serial No. 269,964

Claims priority, application Great Britain February 13, 1951

1 Claim. (Cl. 188—152)

The invention relates to hydraulically-operated friction brakes of the kind comprising a friction disc or ring for attachment to the wheel or other member to be braked and for rotation therewith, two opposed friction pads for braking engagement with opposite side faces of the disc, means for holding the pads against rotation with the disc, and hydraulically operable means for effecting inward movement of the pads to bring them into braking engagement with the disc. In some brakes of this kind there are two or more discs or rings side by side with additional friction pads between them and the outer side faces of the assembly are engaged by the friction pads as aforesaid, the inward movement of the pads also effecting inward movement of the discs into engagement with the additional pads.

It is one object of the invention to provide an improved brake of the kind described especially suited for use with small wheels such as are employed on some high speed modern aircraft. More particularly the object is the provision of a brake of light weight and small bulk which is capable of withstanding the high torque and of absorbing and/or dissipating at the necessary high rate the large amount of heat generated when an aircraft is braked.

The invention consists in a brake of the kind described in which the means for holding the pads against rotation comprise a fixed housing having throughways (later referred to as guideways) in the axial direction in which the pads are guided and constrained for sliding movement, and in which the means for effecting inward movement of the pads comprise piston and cylinder means hydraulically operable to cause relative expansive movement of the piston and cylinder in the axial direction of the disc and two levers cooperating with the piston and cylinder and with the two friction pads respectively to convert outward expansive movement of the piston and cylinder into inward movement of the pads.

Preferably the piston and cylinder means comprise a further throughway in the housing parallel to the aforesaid guide-ways and constituting a cylinder, and two opposed pistons in the cylinder arranged for outward, expansive movement on admission of fluid to the cylinder between the pistons. In one construction the cylinder is radially within the guideways, the levers are fulcrumed at positions between the cylinder and the guideways for rocking movement about axes extending in the tangential direction, the outer ends of the pistons engage the radially inner ends of the two levers respectively and the outer ends of the levers engage the pads so that outward movment of the pistons rocks the levers to move the pads inwardly towards one another into clamping engagement of the disc.

It is preferred that there are two housings with associated pads, levers and piston and cylinder means at diametrically opposed positions around the disc.

There may be two friction discs side-by-side and the housing, or each housing when there are two, may have a tongue extending radially between the discs and provided with friction surfaces so that the friction pads operate to grip the discs against opposite faces of the tongue respectively.

The housing or each housing, may have two piston and cylinder means and associated levers circumferentially side-by-side and operating independently on a single pad at each side of the disc or discs or on two separate pads at each side.

One specific construction of a brake according to the invention will now be described by way of example, and with reference to the accompanying drawings, in which.

Figure 1:
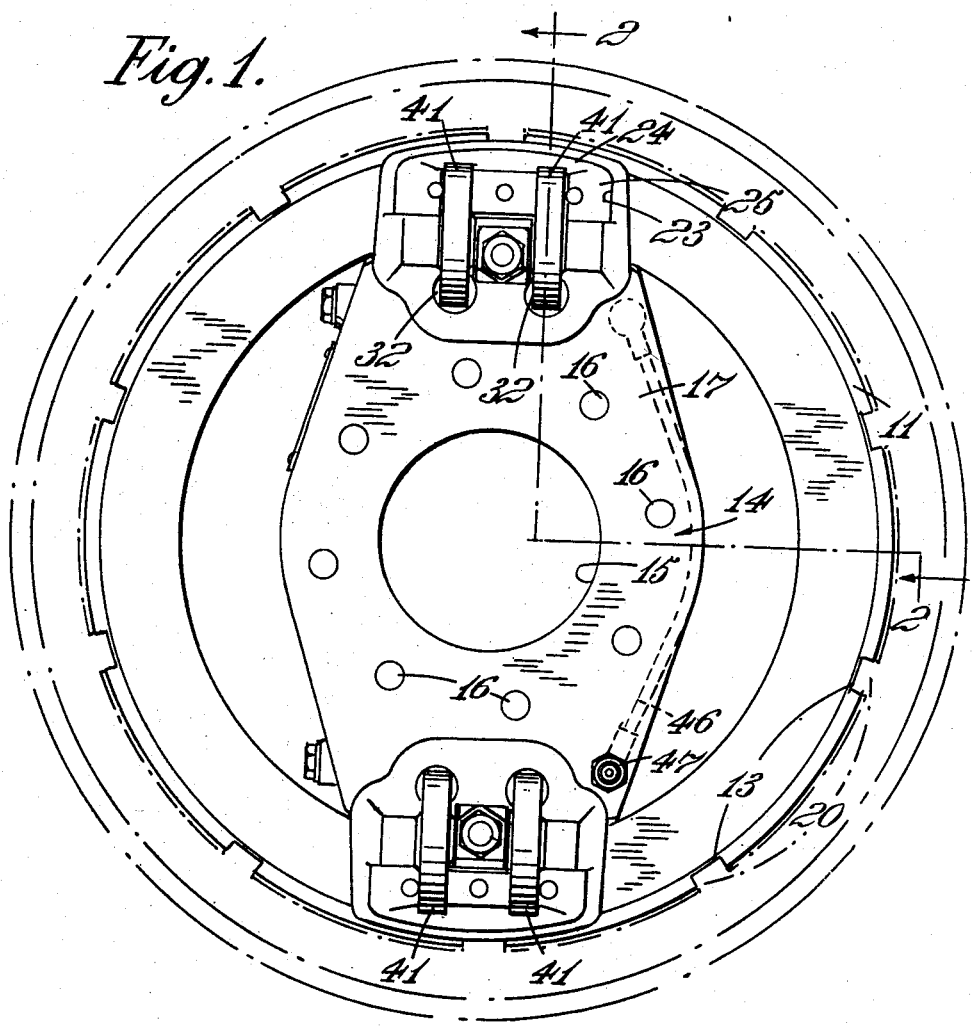
Figure 1 is a front view of the brake.
Figure 2:
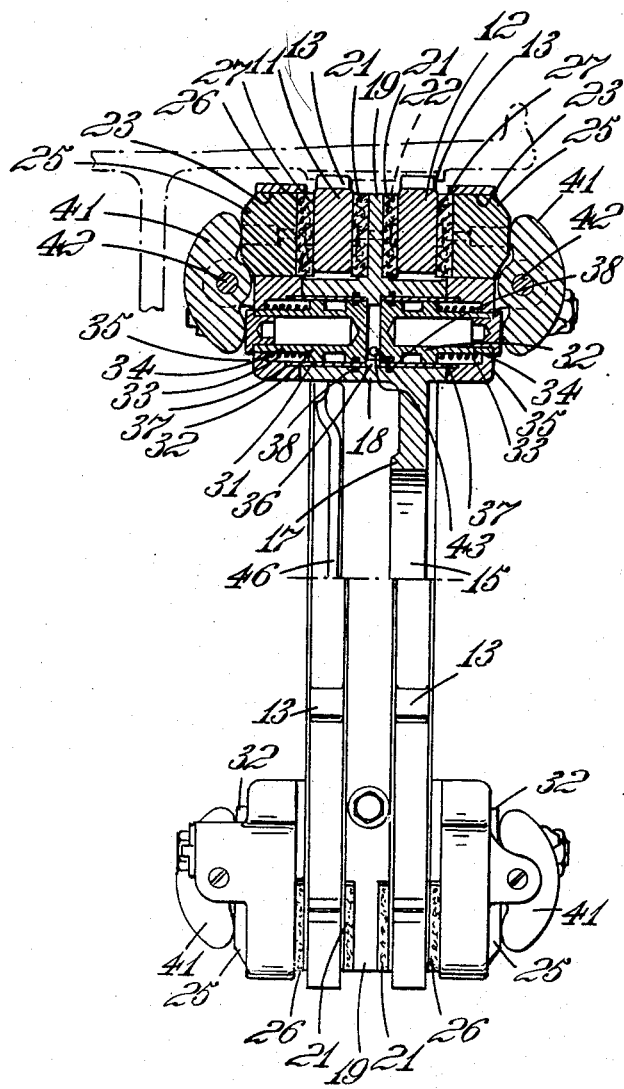
Figure 2 is a side view of the brake, part thereof being shown in section along the line 2—2 in Figure 1.
Figure 3:
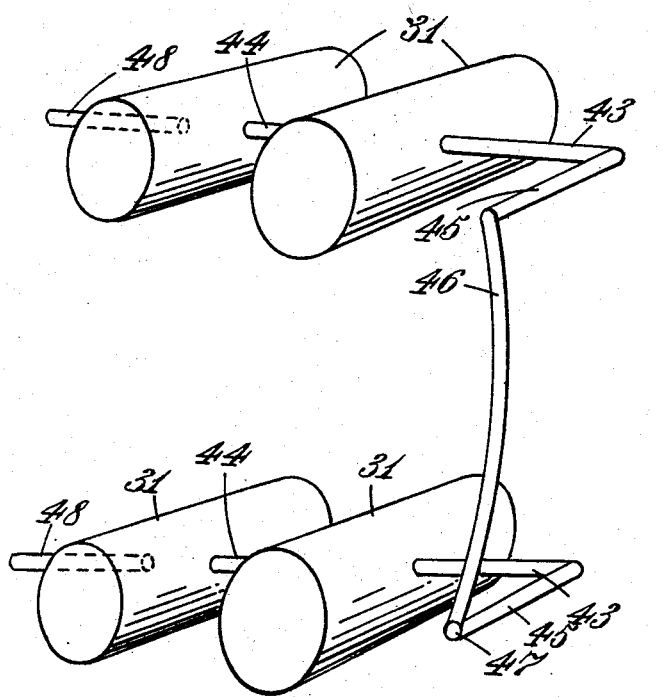
Figure 3 shows diagrammatically the connections for fluid to the cylinders.

The brake forming the subject of this example is intended for use with a small aircraft wheel, part of which is indicated in chain lines. The brake has two friction rings 11, 12 constructed of copper and constituting the friction discs. The rings 11, 12 are positioned side-by-side and each has key slots 13 cut in its outer edge for engagement with keys 20 formed on the inner surface of the wheel, the engagement preventing relative rotation between the discs and the wheel but permitting some degree of relative axial movement.

Arranged to lie within the compass of the wheel there is a plate-like member 14 having a central aperture 15 for passage of the fixed wheel axle and holes 16 for bolts by which the member 14 may be secured to a flange on the axle and is held against rotation. The member 14 provides two diametrically extending arms 17 and at the end of each arm there is a housing 18 integral with the member 14.

Each housing has a radial tongue 19 which fits between the two copper friction rings 11, 12 and has riveted at 22 to its side faces pads 21 of friction material. Two guideways 23 are formed in the housing 18 opposite to the pads 21 on the aforesaid tongue 19. These guideways 23 extend in the axial direction of the assembly and have a cross-section of generally rectangular form with the length in the circumferential direction. The outer side 24 of the cross-section is arcuate about the axis of rotation. Received within each guideway 23 for sliding movement there is a block 25 which carries on its inner face a friction pad 26 for engagement with the outer side face 27 of the adjacent disc 11, 12.

Formed in the housing 18 at positions radially within but close to the aforesaid guideways 23 there are two further throughways 31 extending in the axial direction and side-by-side circumferentially. These throughways 31 constitute two cylinders and within each cylinder there are two opposed pistons 32 which are urged inwardly towards one another by springs 33 which surround portions 34 of the pistons 32 of reduced diameter and react against inwardly directed flanges 35 at the mouths of the cylinders. The inward movement of the pistons 32 is limited by a stop provided by a portion 36 of reduced diameter at the centre of the length of the cylinder. Each cylinder is provided with a sleeve 37 sealed by a sealing ring 38 around the outer surface of the sleeves 37.

Associated with each of the four pistons 32 there is a short lever 41 fulcrumed at 42 to the housing 18 at a position between the cylinder 31 and the guideway 23. One end of the lever 41 bears on the outer end of the piston 32 and the other end of the lever 41 bears upon the slidable block 25 carrying the friction pad 26, the two levers 41 at each side of the housing 18 operating independently on the same block 25.

Connections 43 for an operating liquid are made to one of the two cylinders 31 provided in each housing 18 and the two cylinders in each housing are interconnected at 44. The connections 43 are connected by pipes 45, 46 to an inlet 47. Means 48 for bleeding air from the other of the cylinders in each housing are also provided.

In the operation of the brake, liquid under pressure is admitted to the four cylinders 31 and causes outward movement of the eight pistons 32. This movement rocks the eight levers 41 to force the sliding blocks 25 inwardly so that each opposed pair of blocks 25 clamps the friction rings 11, 12 against the central tongues 19 and provides braking pressure.

The arrangement of the mechanism in each housing and the provision of two diametrically opposed housings and associated mechanisms ensures a particularly even application of the braking pressure and also enables substantial areas of the discs to be exposed for cooling between the housings.

We claim:

A brake for braking a rotatable member against rotation relative to a second member, comprising in combination at least one friction disc having means for attaching the disc to said rotatable member for rotation therewith, two opposed friction pads disposed on opposite sides of said disc for braking engagement with opposite side faces thereof, a housing forked to provide two arms which embrace the disc and formed with at least two aligned tubular guideways in the two arms respectively extending in the axial direction of the disc on opposite sides thereof, within which guideways said pads are guided and constrained for sliding movement by the walls of the guideways, means for preventing rotation of said housing relative to said second member, said housing also being formed with a throughway radially within the guideways and extending parallel to the guideways, two opposed pistons in said throughway, the throughway constituting a cylinder for the pistons, means for admitting hydraulic fluid to the throughway between the pistons to cause outward expansive movement of the pistons in the axial direction of the disc and two levers fulcrumed on the housing at positions between the throughway and the guideways for rocking movement about axes in the tangential direction, the outer ends of the pistons engaging the radially inner ends of the two levers respectively and the outer ends of the levers engaging the two pads respectively, whereby outward movement of the pistons rocks the levers to move the pads inwardly towards one another into clamping engagement of the disc.

JOHN WEBB.
DANIEL WEBB.

References Cited in the file of this patent

UNITED STATES PATENTS

| Number | Name | Date |
| --- | --- | --- |
| 1,827,065 | Brownyer | Oct. 13, 1931 |
| 2,115,083 | Pierce | Apr. 26, 1938 |
| 2,280,599 | Milan | Apr. 21, 1942 |
| 2,541,031 | Butler | Feb. 13, 1951 |

FOREIGN PATENTS

| Number | Country | Date |
| --- | --- | --- |
| 660,209 | Great Britain | Oct. 31, 1951 |